United States Patent [19] [11] 4,125,779
Malinowski [45] Nov. 14, 1978

[54] SMOKE DETECTOR

[75] Inventor: William J. Malinowski, Pembroke, Mass.

[73] Assignee: Chloride, Incorporated, Tampa, Fla.

[21] Appl. No.: 815,103

[22] Filed: Jul. 13, 1977

[51] Int. Cl.[2] ............ G01N 21/26
[52] U.S. Cl. ............ 340/630; 250/574
[58] Field of Search ............ 250/214 B, 573, 574, 250/575; 356/201, 204, 207; 340/237 S, 258 B

[56] References Cited

U.S. PATENT DOCUMENTS

| | | | |
|---|---|---|---|
| 3,874,795 | 4/1975 | Packham et al. | 356/207 |
| 3,892,485 | 7/1975 | Merritt et al. | 250/574 |
| 4,065,759 | 12/1977 | Handing | 340/237 S |

*Primary Examiner*—David C. Nelms
*Attorney, Agent, or Firm*—Robert E. Ross

[57] ABSTRACT

A smoke detector of the type utilizing a pulsing light source and photo-responsive means producing an output signal in response to the receipt of a pulse of light from said source reflected from smoke particles and means for amplifying said output signal to produce an alarm signal, which has exceptionally low current drain so as to be adapted for being powered by a battery, and exceptional immunity to false alarms even when operated at a high sensitivity. On each pulse, the amplifier is energized and allowed to achieve a stabilized condition, prior to energizing the light source, and after the light source is energized, the amplified output signal is not allowed to create an alarm signal until the circuit has again stabilized from transients caused by the energizing of the light, thereby preventing false alarms from circuit transients resulting from internal and external causes.

The circuit operation is controlled by a master clock which provides a slow pulse rate during stand-by operation and an increased pulse rate when an alarm signal is produced in response to the presence of smoke. The clock also causes the alarm to be energized by pulses, which provides a more attention-getting alarm signal than does a continuous alarm, and conserves the strength of the battery.

11 Claims, 6 Drawing Figures

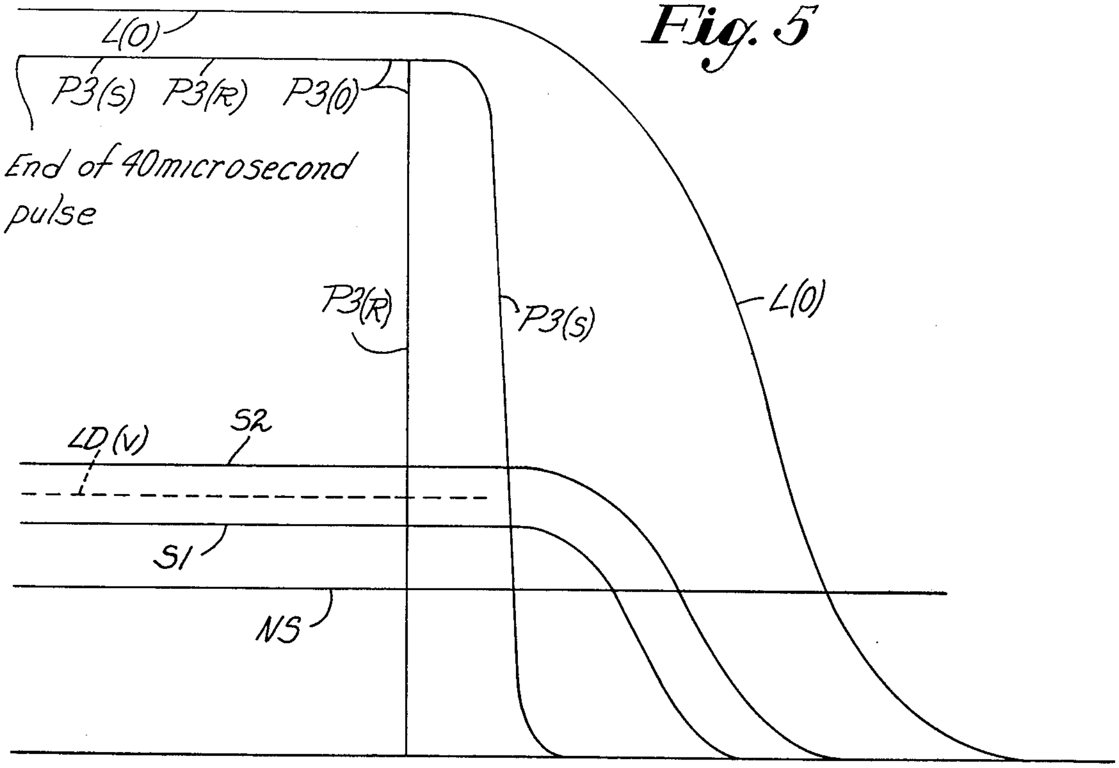
Fig. 5
Fig. 6
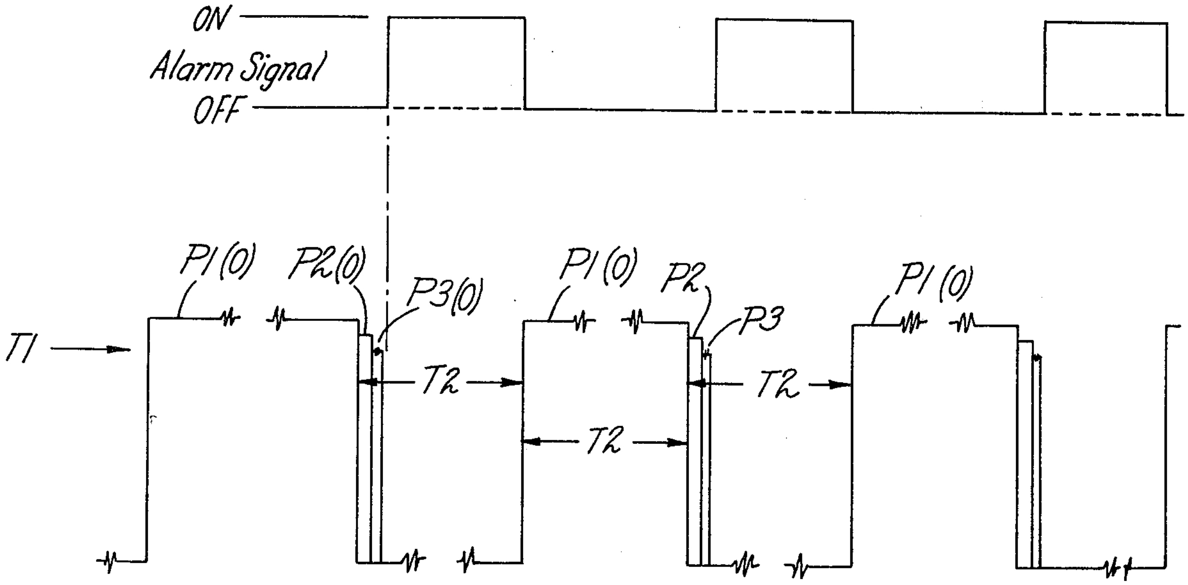

SMOKE DETECTOR

BACKGROUND OF THE INVENTION

Smoke detectors utilizing the so-called Tyndall effect are known which utilize as a light source a pulsing light-emitting diode. One such device is disclosed in my U.S. Pat. No. 3,946,241 issued Mar. 23, 1976. The use of a light-emitting diode which is energized by a very short pulse, as disclosed in said patent, has the desirable features of reducing substantially the possibility of false alarms and increasing the life of the light-emitting diode.

However, there is a need for a smoke detector that has a current drain low enough to allow it to be powered for a long period of time (in excess of one year) by a small battery, and that is sufficiently immune to false alarms to allow it to operate at a high sensitivity.

SUMMARY OF THE INVENTION

The smoke detector illustrated and described herein comprises a light-emitting diode and a photo-voltaic cell so arranged that the cell receives light from the diode reflected from smoke particles in ambient atmosphere, and circuit means for amplifying the cell output to provide an alarm output signal.

A master clock and slave clocks are provided which sequentially energize the amplifier, the light-emitting diode, and open a gating circuit to allow an amplified cell output to provide an alarm signal.

In the sequential energizing of the above-mentioned components, time is allowed for the amplifier to stabilize to a constant output before the light-emitting diode is energized, and thereafter the circuit is allowed time to recover from the transients caused by the energizing of the light before a gating device is allowed to pass the signal to the alarm-energizing device.

The signal to the alarm-energizing device is combined with the pulse output of the master clock to provide a pulsing alarm signal which is more attention-getting then a steady alarm signal, and reduces the energy output required from the battery.

In one embodiment, the gating device is opened, to allow a signal caused by the pressure of smoke, to pass near the end of the energizing pulse to the amplifier and the light source, so that the "window" through which the signal can pass is as narrow as possible to further reduce the possibility of false alarm.

BRIEF DESCRIPTION OF THE DRAWINGS

FIG. 5 is a representation of the right end portion of the pulse of FIG. 4 on a further-enlarged time scale, illustrating the relative time of occurrence of certain circuit functions at the termination of the pulse.

FIG. 6 is a representation showing the pulse spacing after an alarm signal has been generated due to the presence of smoke, in relation to the spacing of the alarm-energizing pulses.

DESCRIPTION OF THE ILLUSTRATED EMBODIMENT

Figure 1:
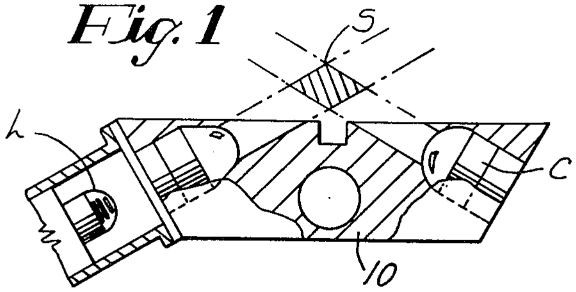
FIG. 1 is a schematic diagram of the optical components of a smoke detector with which the present invention can be utilized.

Referring to the drawing, there is illustrated in FIG. 1 a schematic diagram of the arrangement of the physical components of a smoke detector with which the present invention can be utilized, comprising a support block 10 carrying a light source L positioned to illuminate smoke particles S appearing in the space in front of the block, and a photo-responsive device C viewing a portion of the volume illuminated by the light. In the illustrated embodiment of the invention, the light source L is a light-emitting diode and the photo-responsive device C is a photo-voltaic cell.

Figure 2:
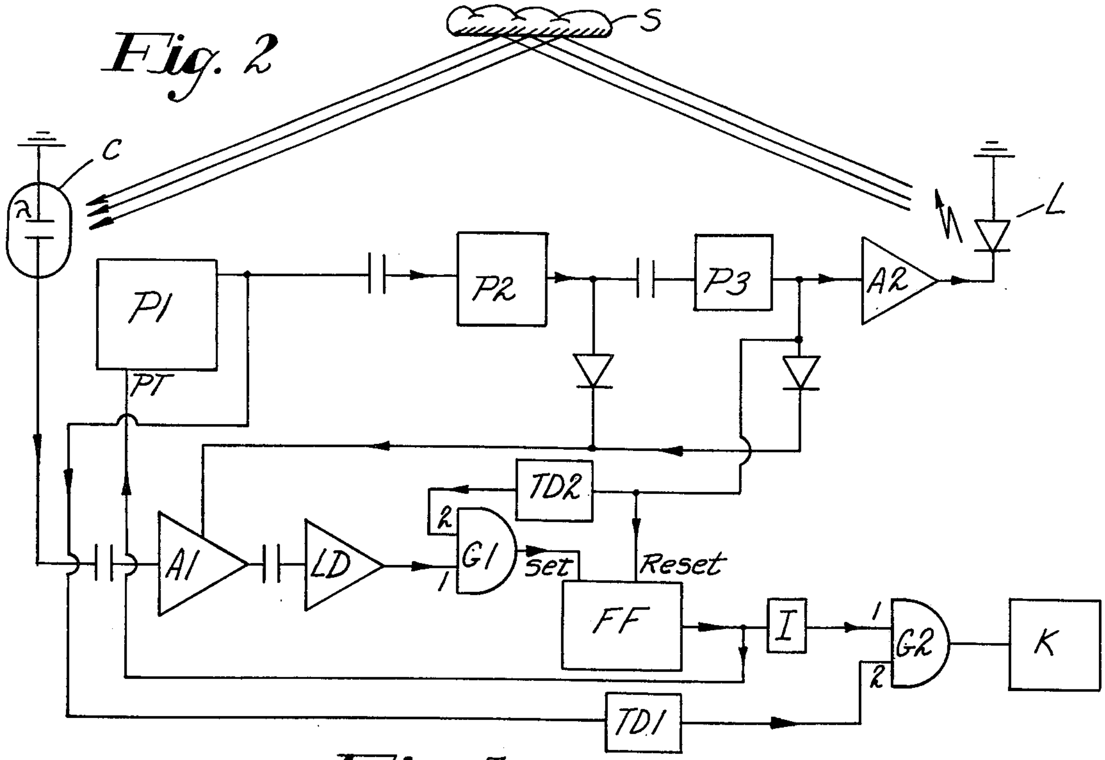
FIG. 2 is a schematic diagram of a circuit of a smoke detector embodying the features of the invention.

Referring to FIG. 2, there is illustrated a schematic diagram of an electrical circuit of a smoke detector embodying the invention. The cell C is connected to amplifier A1, which is intermittently powered in a manner to appear hereinafter, the output of which is fed to a level detector LD, the output of which is fed to a first terminal of an AND gate G1, the output of which is fed to the set terminal of a bi-stable switching device such as a flip-flop FF.

The flip-flop output is fed to an integrator I and then to the first terminal of AND gate G2, the output of which is fed to alarm-energizing means K and also to a square wave generator P1, which may be an astable multi-vibrator, serving as a master clock. In the illustrated embodiment the master clock P1 has two rates. In the stand-by mode, the clock produces a square wave P1 (0) of 4 seconds duration every 8 seconds and in the alarm mode produces a square wave of 1 second duration every 2 seconds.

The pulse generator P1 normally runs at the slower rate and is responsive to a signal to the speed-up terminal PT to increase to the faster rate.

During stand-by operation, the termination of the 4 second pulse P1(0) from P1 actuates slave clock P2 which may be a mono-stable multi-vibrator, which produces a 35 millisecond square wave output pulse P2(0) which energizes the amplifier A. The termination of the 4 second pulse P1(0) from P1 also causes a signal to be applied to the second terminal of AND gate G2 through time delay TD1 for a purpose to appear hereinafter.

Figure 3:
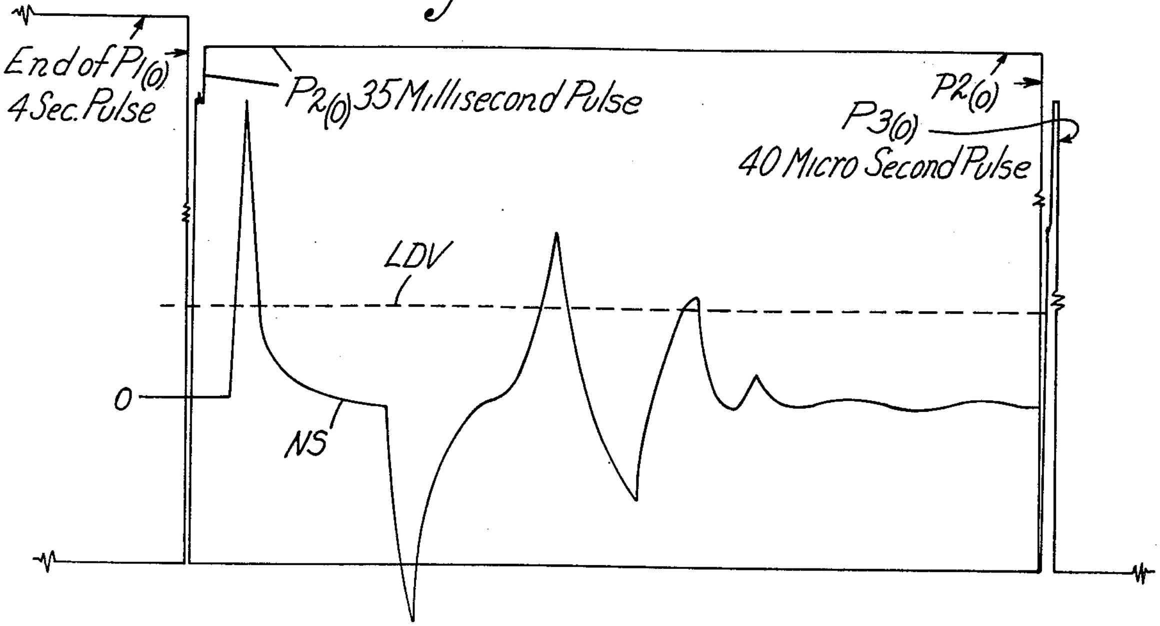
FIG. 3 is a diagram illustrating the time spacing of the pulses occurring in the circuit of FIG. 2.

As illustrated by curve NS of FIG. 3, the energizing of the amplifier causes sudden erratic variations in amplifier output, which may exceed the level detector threshold LDV until the circuit stabilizes. The pulse time of 35 milliseconds is sufficient to allow this stabilizing to occur.

The termination of the 35 millisecond square wave pulse P2(0) from P2 actuates slave clock P3 which may be a mono-stable multi-vibrator, producing a square wave pulse P3(0) of 40 microseconds, which pulse is applied to the amplifier A1 to maintain it in the energized condition (the energizing pulse P2(0) from P2 having terminated); to the light-emitting diode L through amplifier A2 to energize the light; to the reset terminal of the flip-flop FF; and, through a time delay TD2, to the second terminal of the AND gate G1.

The application of power to the light L causes further transients to occur in the amplifier circuit (see curve NS of FIG. 4) of sufficient magnitude, that is, in excess of the value LDV above which the level detector will provide an output, to cause a false alarm. In a particular embodiment of the invention, an amplifier output of 0.5 volts is sufficient to satisfy the requirements of the level detector so as to apply a signal to the flip-flop AND gate. With a battery voltage of 9 volts, the amplifier output fluctuations, in the absence of smoke, can easily exceed this value.

To avoid false alarms from this cause, the flip-flop FF is prevented from producing an output by the fact that the signal to the reset terminal of the flip-flop, in the illustrated embodiment, is maintained by the P3(0) pulse until the termination thereof at which time the signal to the amplifier A1, to light L, to the reset terminal of the flip-flop, and to terminal 2 of the AND gate G1 are terminated.

Figure 4:
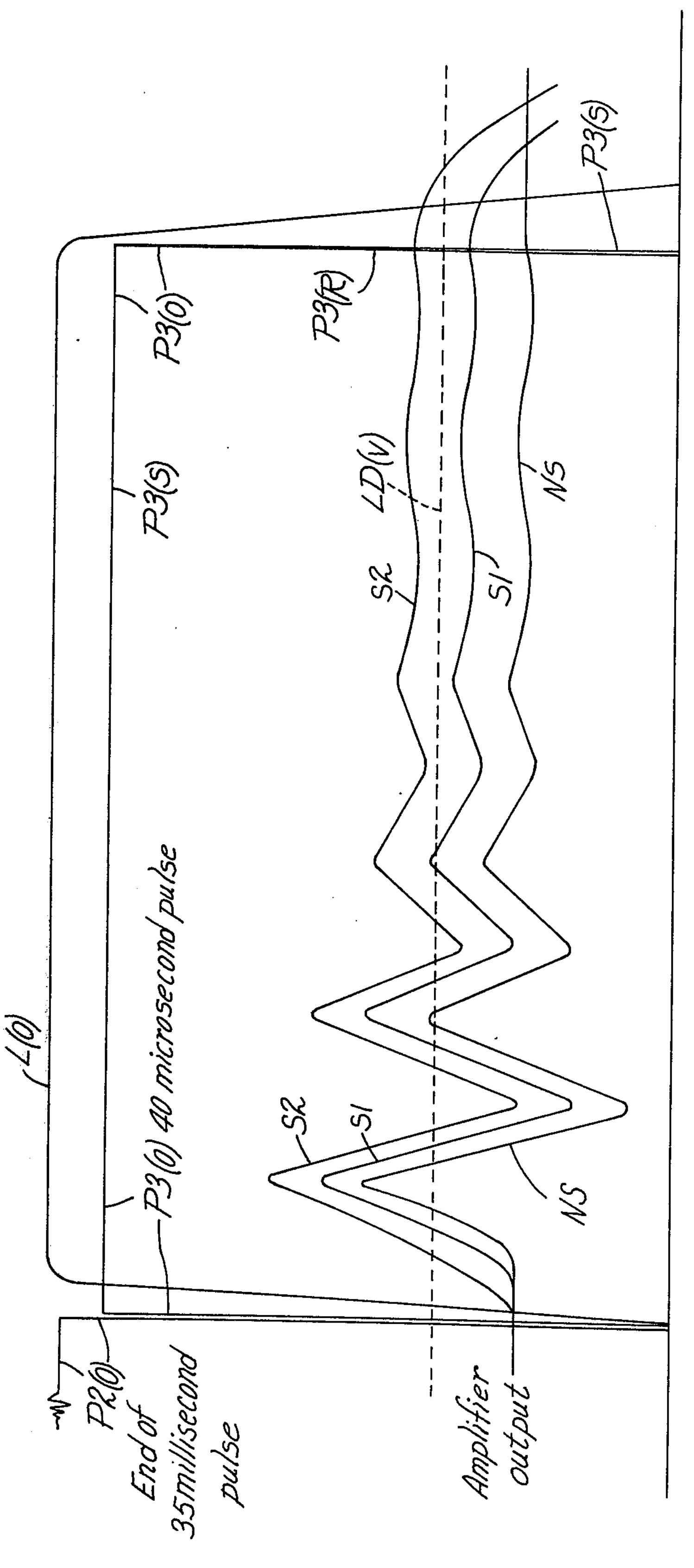
FIG. 4 is a representation, on an enlarged time scale, of the final pulse in the pulse sequence illustrated in FIG. 3, illustrating the relative time of occurrence of other circuit functions during the pulse.

As illustrated in FIG. 5, which is a representation on an expanded time scale of the right end of FIG. 4, curve P3(0) represents the pulse from square wave generator P3, curve P3(R) represents the input from pulse P3(0) to the reset terminal of the flip-flop, curve P3(0) represents the input from pulse P3(0) to terminal 2 of AND gate G1 and curve L(0) represents the output intensity of the light L, all on an arbitrary vertical scale.

In FIG. 5, when the pulse P3(0) is terminated, the signal P3(0) to the reset terminal disappears substantially instantly; however, because of the time delay TD-2 (which may be an RC network), the signal P3(S) to terminal 2 of the AND gate G1 is maintained for a short period of time after the signal to the reset terminal has disappeared. The light output, represented by curve L(0), also continues for a short period of time after the termination of pulse P3(0), due to capacitance contained in the LED amplifier A2.

As previously stated, the master clock P1 produces a square wave pulse P1(0) every 8 seconds, said wave having a duration of 4 seconds; however, if there is no smoke in the ambient atmosphere no signal is produced by the cell C and there is no output from the level detector LD. Hence although a signal from the slave clock P3 appears at terminal 2 of AND gate G1 at the end of each P3(0) pulse, no signal is provided from the level detector to the first terminal of the AND gate G1, hence no flip-flop output appears.

However, when smoke is present in the ambient atmosphere, it is illuminated by the pulse of light from the light emitting diode L, and light reflected from the smoke onto the cell C causes a voltage pulse signal to appear at the input of amplifier A. The amplified output signal which is a function of smoke concentration, appears at the input of the level detector, and if the signal has sufficient magnitude, a level detector output signal is applied to the first terminal of the AND gate G1 substantially for the duration of the 40 microsecond pulse from P3.

In FIG. 4, curve NS represents the amplifier output during the P3(0) pulse under conditions of no smoke, curve S1 represents the amplifier output when the smoke concentration is slightly below the predetermined concentration at which it is intended that the alarm be actuated, and curve S2 represents the amplifier output when the smoke concentration is slightly above said predetermined concentration.

The output signal when smoke is present is affected by the circuit transients resulting from the energization of the light source, just as is the amplifier output with no input signal (curve NS), so that the amplifier output resulting from a smoke concentration below the predetermined concentration may cross back and forth several times over the level LD(V) before stabilizing, which may provide intermittent signals to terminal 1 of AND gate G1. During this period, there is also a signal being applied to terminal 2 of the AND gate G1, so that, whenever the amplifier signal is above the value LD(V) required by the level detector, a signal is applied to both terminals of the flip-flop FF. However, no output from the flip-flop results, since the pulse P3(0) continues to apply a signal P3(R) to the flip-flop reset terminal thereby preventing a flip-flop output.

The amplifier output fluctuations resulting from the energizing of the light L substantially terminate by the end of the 35 millisecond pulse, so that by the end of said pulse, the amplifier output has stabilized at a value below LD(V) (at a smoke concentration producing curve S1) so that when the signal to the reset terminal of the flip-flop disappears, there is no longer a signal to terminal 1 of AND gate G1, hence no signal to the set terminal of the flip-flop, and no output signal to the integrator I.

However, when the smoke concentration is slightly above the predetermined concentration, the amplifier output stabilizes at a value slightly above LD(V). Hence when the reset pulse disappears, leaving a signal P3(S) at terminal 2 of AND gate G1, a signal exists at terminal 1 of said AND gate, and hence a signal is applied to the set terminal of the flip-flop producing a flip-flop output.

The integrator I further reduces the possibility of false alarms, since it is designed to require, for example, a signal from three consecutive pulses before it will provide a signal to terminal 1 of AND gate G2.

To reduce the time required to produce an alarm after a first pulse has produced a signal indicating the presence of smoke, the flip-flop output is fed to the speed-up terminal PT of P1, so that the time to the next pulse is reduced to 1 second. The master clock P1 continues to operate at the faster repetition rate so long as there is an output from the flip-flop.

Although the amplifiers A1 and A2, the level detector LD and the light L are de-energized on the termination of the 40 microsecond pulse, the flip-flop FF continues to produce an output (if a smoke signal has been received by the AND gate G1) until a signal is applied to the reset terminal thereof, which does not occur until the beginning of the next 40 millisecond pulse from square wave generator P3, that is, 35 milliseconds after the termination of the next pulse from master clock P1.

However, the horn is de-energized at the beginning of the next pulse from the master clock P1, since the signal from P1 to terminal 2 of the AND gate G2 terminates at the beginning of the pulse to slave clock P2.

If smoke continues to be present, the next pulse to slave clock P3 from slave clock P2 will cause the flip-flop output to terminate, since the resulting output pulse from P3 is fed to the flip-flop reset terminal. However, if smoke continues to be present in the required concentration, the flip-flop output is terminated for only about 40 microseconds since another set signal is produced at the end of said 40 microsecond P3 pulse. Hence during conditions of continuing smoke, the master clock P1 continues to operate at the faster rate, and a continuing signal (except for 40 microsecond gaps) exists at terminal 1 of AND gate G2.

The alarm signal is therefore controlled by a combination of signals from the master clock P1 and from the flip-flop FF, (see FIG. 6) the alarm being energized at the end of the pulse from P3 and de-energized at the beginning of the next pulse from the master clock P1.

The alarm therefore has a pulsing output, which is more attention-getting than a steady output, provides a lower total current drain on the battery, and provides an overall louder signal, since the interval between pulses allows the battery time to recover from the effect of the alarm current drain.

Although in the illustrated embodiment, the termination of the signal to the reset pulse, allowing a signal at the set terminal to be effective to cause a flip-flop output, occurs at the end of the P3 pulse, it will be apparent that if desired the reset signal could be removed at any time during the 40 microsecond P3 pulse after the amplifier output has substantially stabilized.

Since certain other obvious changes may be made in the illustrated embodiment of the invention without departing from the scope thereof, it is intended that all matter contained herein be interpreted in an illustrative and not a limiting sense.

I claim:

1. In a smoke detector of the type comprising a light source, a photo-responsive device producing an output signal in response to light from the light source reflected from smoke particles, an amplifier for amplifying said output signal, and alarm actuating means responsive to an amplified output signal above a predetermined level to actuate an alarm, the improvement comprising normally closed gating means between the amplifier and the alarm actuating means, circuit means for, in sequence, energizing the amplifier, energizing the light source, and opening said gating means, and means for de-energizing the amplifier and the light source substantially simultaneously.

2. A detector as set out in claim 1 in which said gating means is opened substantially at the de-energization of the light source and amplifier.

3. A detector as set out in claim 1 in which the energization of the light source occurs a sufficient time after the energization of the amplifier to allow the amplifier output to stabilize from the transients resulting therefrom, and the opening of the gate occurs a sufficient time after the energization of the light source to allow the amplifier output to stabilize from the transients caused by the energization of the light source.

4. A detector as set out in claim 3 in which an energizing pulse of predetermined time is applied to the amplifier, and having means responsive to the termination of the pulse to the amplifier to apply an energizing pulse to the light source and to the amplifier to maintain the amplifier in the energized condition while the light source is energized.

5. A detector as set out in claim 4 in which means is provided to open said gate on termination of the pulse to the light source.

6. In a smoke detector of the type that utilizes a pulsing light source to create output pulses when smoke is present, and an amplifier for amplifying said output pulses to produce signal pulses to alarm actuating means, the improvement comprising a first pulse generator producing output pulses at a predetermined rate, a second pulse generator responsive to the termination of each pulse from the first pulse generator to apply an energizing pulse to the amplifier, a third pulse generator responsive to the termination of the pulse from the second pulse generator to apply an energizing pulse to said light source and to said amplifier, and gating means between the amplifier and the alarm actuating means, said gating means being normally in a first condition in which a signal pulse is prevented from passing to the alarm actuating means, and means responsive to the presence of an output signal at said gating means to shift said gating means to a second condition after the energization of said light source.

7. In a smoke detector of the type having a light source energized intermittently by pulse generating means, means responsive to pulses of said light reflected from smoke particles to produce output voltage pulses, an amplifier for amplifying said voltage pulses to produce an output signal, and means responsive to an output signal above a predetermined level to actuate alarm producing means, the improvement comprising gating means between the amplifier and the alarm producing means, said gating means being normally closed to prevent the output signal from actuating the alarm producing means, and means operative at substantially the termination of the energizing pulse to the light source to open said gate to allow an output signal to actuate the alarm producing means.

8. A detector as set out in claim 7 in which the gate opens only after the termination of the energizing pulse to the light source.

9. In a smoke detector of the type comprising an intermittently energized light source, a photo-responsive device responsive to the light from the light source reflected from smoke particles to produce an output signal, amplifier means for amplifying said output signal, and first gating means responsive to an amplifier output signal above a predetermined level to allow the amplifier output signal to pass to alarm actuating means, the improvement comprising second gating means which is normally closed and is opened substantially at the termination of the energizing pulse to the light source.

10. A gating circuit for a smoke detector comprising a gating device with two inputs and one output and being responsive to signal at a first input to prevent an output signal and being responsive to an input signal at the second input in the absence of a signal at the first input to produce an output, an AND gate having two inputs and one output, the output of the AND gate being connected to said second terminal, one input of the AND gate being connected to the output of a smoke detecting circuit which produces a signal in response to the presence of smoke, means applying an actuating pulse simultaneously to said one input of the gating device and to the other input of the AND gate through a time delay network whereby on termination of the actuating pulse a signal remains at the AND gate after the signal disappears from the first input of the gating device, and if a signal from the smoke detecting circuit exists at said one input of the gating device, said gating device will produce an output signal.

11. In a smoke detector of the type having a light source, a pulse generator providing energizing pulses to the light source, and means producing an output signal to alarm actuating means in response to light from the source reflected from smoke particles, the improvement comprising an AND gate having two inputs and one output, the output being connected to the alarm actuating means, the output of the means producing an output signal being connected to one input of the AND gate, and the pulse generator being connected to the other input of the AND gate whereby when smoke is present, the alarm is energized and de-energized in synchronism with the pulses of the pulse generator to produce an intermittent alarm output.

* * * * *